US008000233B2

(12) United States Patent
Anderson et al.

(10) Patent No.: US 8,000,233 B2
(45) Date of Patent: Aug. 16, 2011

(54) METHOD AND APPARATUS FOR REAL-TIME APPLICATION-DRIVEN RESOURCE MANAGEMENT IN NEXT GENERATION NETWORKS

(75) Inventors: Thomas Wayne Anderson, Naperville, IL (US); Igor Faynberg, East Brunswick, NJ (US); Hui-Lan Lu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 597 days.

(21) Appl. No.: 11/364,698

(22) Filed: Feb. 28, 2006

(65) Prior Publication Data
US 2007/0201513 A1 Aug. 30, 2007

(51) Int. Cl.
*G01R 31/08* (2006.01)
*H04J 3/16* (2006.01)

(52) U.S. Cl. .................. 370/230; 370/252; 370/468

(58) Field of Classification Search .......... 370/241, 370/252, 464, 465, 467, 468, 470, 229, 230, 370/310, 328, 329, 351, 352, 356; 455/403, 455/422.1, 450, 452.1, 452.2, 219; 379/403, 379/422.1, 450, 452.1, 452.2
See application file for complete search history.

(56) References Cited

U.S. PATENT DOCUMENTS

| 2003/0007621 A1* | 1/2003 | Graves et al. ............. 379/219 |
| 2006/0203773 A1* | 9/2006 | Georges et al. ............ 370/329 |
| 2006/0245426 A1* | 11/2006 | Rasanen ................... 370/389 |
| 2007/0201446 A1* | 8/2007 | Wright ..................... 370/356 |
| 2007/0258399 A1* | 11/2007 | Chen ....................... 370/328 |
| 2007/0263535 A1* | 11/2007 | Shabtay .................... 370/230 |
| 2007/0268930 A1* | 11/2007 | Bond et al. ................. 370/467 |

FOREIGN PATENT DOCUMENTS

| EP | 158 9696 A1 | 10/2005 |
| JP | 2003-248135 A | 9/2003 |
| WO | WO 02/51188 A1 | 6/2002 |

OTHER PUBLICATIONS

International Telecommunication Union, NGN FG Proceedings Part I, 2005, p. 11.*
International Telecommunication Union, NGN FG Proceedings Part II, 2005, pp. 224, 225, 295-299, 427.*
Machine translation of JP2003-248135(A).*

(Continued)

*Primary Examiner* — Ricky Ngo
*Assistant Examiner* — Paul Masur
(74) *Attorney, Agent, or Firm* — Wall & Tong, LLP

(57) ABSTRACT

A method and apparatus for supporting end-to-end quality of service (QoS) reservations for an implicit reservations model are provided. The invention teaches how to implement implicit resource reservations using the open-standard Resource and Admission Control Function (RACF). A request for resources for a given reservation between an originating and a terminating point in a network is received. A central controller for that domain processes the request for a given domain to determine whether routes for said reservation are available and whether necessary bandwidth for said reservation is available. An implicit reservation and a release of the bandwidth are respectively accomplished with a specific number of messages.

If the routes and bandwidth are available, the reservation for the given domain is confirmed and the reservation request is passed to another central controller for a next domain having resources required to satisfy the reservation request.

17 Claims, 3 Drawing Sheets

OTHER PUBLICATIONS

H. Uzunaliouglu et al., "An Architecture and Admission Control Algorithm for Multi-Priority Voice Over IP (VoIP) Calls", *Proceedings of the 9th International Conference on Intelligence in Service Delivery Networks (ICIN'04 )*, Oct. 2004, Bordeaux, France.

K-H. Ho et al., Multi-objective Egress Router Selection Policies for Inter-domain Traffic with Bandwidth Guarantees, *Proceedings of the IFIP Networking Conference (Networking'2004 )*, Athens, Greece, May 2004.

Tromparent M—M: "Communication protocol for inerdomain resource reservation" Service Assurance With Partial and Intermittent Resources. First International Workshop, Sapir 2004. Proceedings (Lecture Ntoes in Comput. Sci. vol. 3126) vol. 3126, Aug. 1-6, 2004 pp. 255-266 XP002437974 Abstract p. 255, line 1-p. 256, line 12; p. 257, line 28-line 40; p. 264, line 14-p. 265, line 21: figure 7.

Bless R et al: "Quality-of-service signaling in wireless IP-based mobile networks" Vehicular Technology Conference, 2003. VTC 2003-Fall. 2003 IEEE 58$^{TH}$ Orlando, FL, USA Oct. 6-9, 2003, Piscataway, NJ USA, IEEE, US, Oct. 6, 2003, pp. 3527-3531, XP010702441 ISBN: 0-7803-7954-3 p. 3528, left-hand column.

PCT International Search Report dated Jun. 27, 2007.

RFC2505, "Anti-spam Recommendations for SMTP MTAs," G. Lindberg, Chalmers U of Tech, Feb. 1999.

RFC3272, "Overview and Principles of Internet Traffic Engineering," D. Awduche et al., Redback Networks, May 2002.

RFC4080, "Next Steps in Signaling (NSIS): Framework," R. Hancock et al., Alcatel, Jun. 2005.

* cited by examiner

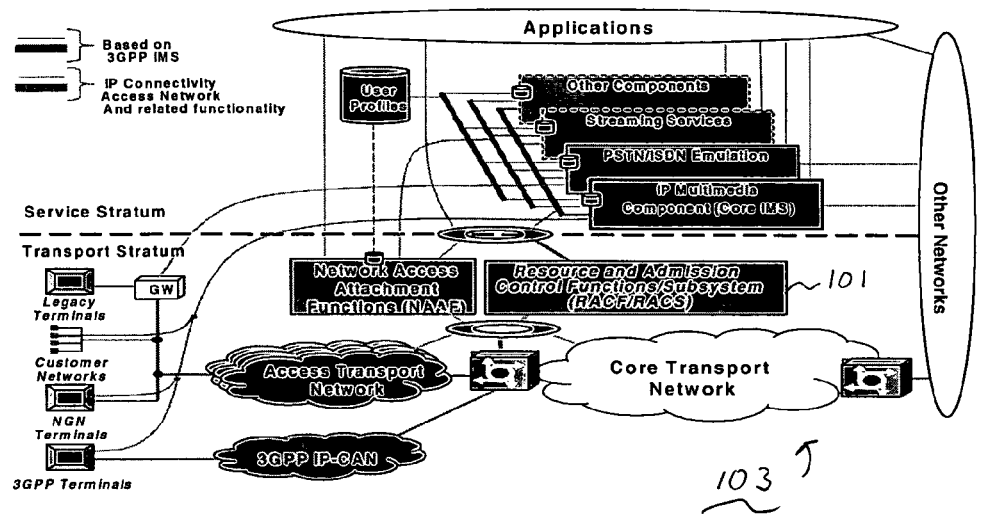

Fig. 1 Position of RACF and RACS in the NGN

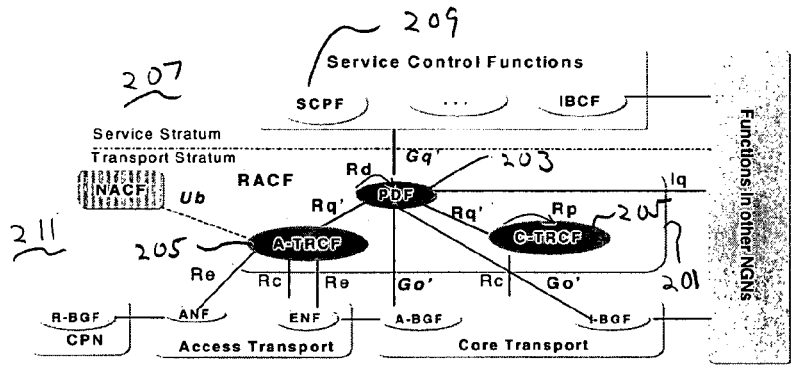

ANF — Access Node Function
ENF — Edge Node Function
NACF — Network Attachment Control Functions
BGF — Border Gateway Function
R-BGF — Residential BGF
A-BGF — Access BGF
I-BGF — Interconnection BGF IBCF — Interconnection Border Control Function
PDF — Policy Decision Function
TRCF — Transport Resource Control Function
A-TRCF — Access TRCF
C-TRCF — Core TRCF
SCPF — Service Control Proxy Function Fig. 2 RACF Architecture

PDF: Policy Decision Function
TRCF: Transport Resource Control Function
TRAD: TRCF Topology and Resource Allocation Database

METHOD AND APPARATUS FOR REAL-TIME APPLICATION-DRIVEN RESOURCE MANAGEMENT IN NEXT GENERATION NETWORKS

TECHNICAL FIELD

This invention relates generally to the field of telecommunications and in particular to resource management in Next Generation Networks.

BACKGROUND OF THE INVENTION

The Next Generation Network (NGN) is characterized, among other things, by the prevalent use of the Internet Protocol (IP) for end-to-end packet transfer. But the main mission of the NGN is flawless support of a wide range of applications, including real-time multimedia, over the packet infrastructure. This requirement and those for security and reliability together are so broad and diversified that one can envision the NGN as a distributed general-purpose computing engine. Here, the early Internet model of the network as a "best-effort" pipe is converging with the modern combined Information Technology and Telecommunications model of the network as a super-large computer. Consequently, the responsibilities of the NGN expand—from merely supporting connectivity—toward assuring the quality of services comprehensively.

The key to fulfilling this expanded duty is dynamic resource management. Indeed, among the most active topics in the present research and development on the NGN is real-time application-driven resource management. The resources that need to be managed include
1. Bandwidth;
2. IP addresses;
3. Transport (TCP and UDP) ports;
4. Various database records; and
5. MPLS label-switched-paths, among many others. In fact, the very multitude of these "others" is what necessitates an abstraction of the resource concept and the development of the appropriate mechanisms based on this abstraction.

There is a need to concentrate on the application-driven and real-time aspects of resource management that are of particular importance in the NGN because of the need for coupling the service control and transport resource control. First, such coupling enables the fast introduction of new services (such as IP telephony, IP TV, and IP gaming) for which performance is a key differentiator. Second, it allows the services to evolve independently of the packet transport technology.

The IETF RFC 2753 specifies a framework for policy-based admission control. This framework underpins the IP Multimedia Subsystem (IMS) service-based local policy control, as specified in 3 GPP TS 23.207. That, in turn, has become the basis for the resource- and policy-based admission control mechanisms being standardized in both the ETSI (or rather ETSI TISPAN project, to be specific) and ITU-T Study Groups 11 and 13.

The emerging standard mechanisms have been designed to allow the admission decision for a service request (IMS- or non-IMS-supported) to take into consideration both policy and transport resource availability. They enable performance assurance and border control (e.g., NAPT, NAT traversal, and gating) through bridging service control and transport resource management. The mechanisms are defined as part of the Resource and Admission Control Subsystem (RACS) in the ETSI TISPAN project and the Resource and Admission Control Functions (RACF) in the ITU-T, however, functionalities for Real-Time Application-Driven Resource Management in Next Generation Networks have yet to be developed.

SUMMARY OF THE INVENTION

An advance is made over the prior art in accordance with the principles of the present invention that the present invention specifies a mechanism for supporting end-to-end quality of service (QoS) reservations for an implicit reservations model using a Resource and Admission Control Function (RACF) apparatus. In one exemplary embodiment a method for resource management in a communications network having multiple domains is taught comprising the steps of receiving a request for resources for a given reservation between an originating and a terminating point in said network and processing said request for a given domain by a central controller for that domain to determine whether routes for said reservation are available and whether necessary bandwidth for said reservation is available. If the routes and bandwidth are available, confirming said reservation in said given domain is confirmed and said reservation request is passed to another central controller for a next domain having resources required to satisfy said reservation request. In one embodiment of the invention, each central controller in a path between the originating point and the terminating point of the reservation keeps state for the reservation request. In another embodiment, only one end central controller in a path between the originating point and the terminating point of the reservation keeps state for the reservation request. In a further embodiment, each end central controller in a path between the originating point and the terminating point of the reservation keeps state for the reservation request, the reservation request converging toward a point between the originating and terminating point of said request, wherein state information of each central controller is then shared.

An apparatus for resource management in a communications network having multiple domains is also described. The resource management is accomplished on a domain wide basis, and said apparatus comprises a controller operable to receive a request for resources for a given reservation between an originating and a terminating point in said network. The controller is further operable for a given domain to determine whether routes for said reservation are available and whether necessary bandwidth for said reservation is available. If the routes and bandwidth are available, said apparatus confirms said reservation in said given domain and passes said reservation request to another controller for a next domain having resources required to satisfy said reservation request.

BRIEF DESCRIPTION OF THE DRAWING

The teachings of the present invention can be readily understood by considering the following detailed description in conjunction with the accompanying drawings, in which:

FIG. 1 shows in simplified block diagram the position of RACF and RACS in an NGN.

FIG. 2 is an exemplary RACF Architecture;

DETAILED DESCRIPTION

Figure 3:
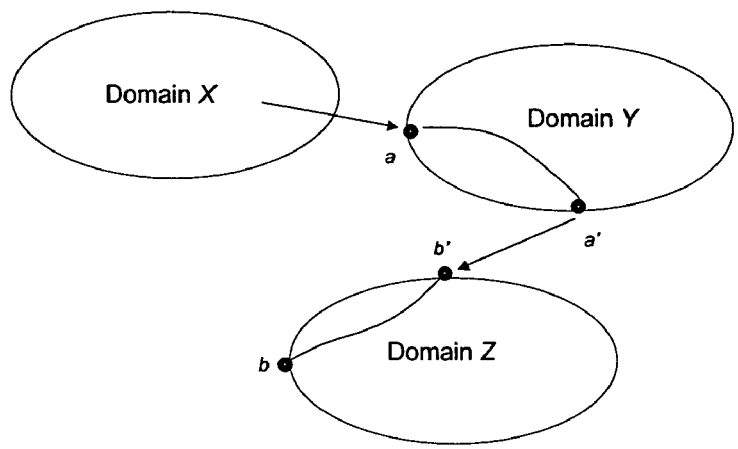
FIG. 3 shows an exemplary network having a communication between multiple domains therein

The present invention specifies the mechanism for supporting end-to-end quality of service (QoS) reservations for an implicit reservations model using a Resource and Admission Control Function (RACF) apparatus. Although the invention is described with respect to the RACF, it would be understood that other apparatus that include like functionality, may also be utilized in connection with the present invention.

Implicit resource reservations rely on stored information about available (provisioned or previously reserved) fat pipes. In such cases the system must keep track of the used and available bandwidth through accounting (by keeping the state of the active sessions) or auditing the involved network elements.

The invention teaches how to implement implicit resource reservations using the open-standard Resource and Admission Control Function (RACF), which is being standardized in ITU-T.

Several methods are covered:
1) With a first method, a general distributed approach has been specified.
2) For a second method, the terminating RACF keeps the state of the reservations, so the resulting protocol is relatively simple, robust, and easy to implement.
3) A third method, which can be based on either of the above methods or their combination, starts reservations at both, the terminating and originating RACF ends and works toward the meet-me point.

The present invention is an advance over the prior art in that a central controller for a given domain or part of a domain keeps track of the allocation of resources in that domain for given reservation requests. More specifically, a controller is able to guarantee that certain routes are available within a domain and that the bandwidth associated with those routes is also available. Many prior art methods utilized individual routers along a path to track such information, which as would be understood, has become quite cumbersome and, more important, non-scalable. In addition, whereas previous art methods supported uni-directional flow reservations; in contrast, the present invention supports both uni- and bi-directional reservations.

As shown in FIG. 1, RACS and RACF 101 have the same position in the overall next generation network architecture 103. Because RACF is more general, we examine resource management mechanisms in the context of RACF.

As depicted in FIG. 2, RACF 201 as shown with other functional entities in a NGN contains two major functional entities: a Policy Decision Function (PDF) 203 and Transport Resource Control Function (TRCF) 205.

At a high level, the PDF 203 is responsible for authorizing a resource request based on policy as well as resource availability and applying a variety of controls to transport entities The controls include opening and closing of ports, NAPT, NAT traversal, and packet marking.

The TRCF 205 has access to the transport resource usage and network topology information, and thus it can check the resource availability on the request of the PDF. The PDF interacts with TRCF through the Rq' reference point.

RACF has relationships with service control functional entities at the service stratum 207 (such as the Service Control Proxy Function 209, of which the IMS Proxy Call State Control Function [P-CSCF] is one example) and functional entities at the transport stratum 211 (such as border gateway function) through various reference points, including Gq' and Go'.

Additionally, admission control is a fundamental RACF capability for preventing and containing network congestion. As a result the network can always operate within its engineered capacity with the desired performance. An admission decision can depend on a variety of factors, such as network resource availability or policy rules for administering, managing and controlling access to network resources. The policy rules can be specific to the needs of the service provider or they can reflect the agreement between the customer and service provider. The latter agreement may specify reliability and availability requirements over a period of time. To satisfy the reliability and availability needs for certain services (e.g., emergency communications), the associated traffic can be given a higher than normal priority for admission to the network.

In an application-driven environment, to guarantee quality of service, it is essential that admission control be coupled with service control (or session management in the case session-oriented applications) such that resource availability is part of the decision making for granting an application request. Care should be given to the accuracy of the resource availability information (i.e., how close it needs to reflect the current load of a node, link or path). There needs to be a balance between the optimal use of resources and computational cost for achieving that. Similarly, because reliability and security requirements usually create additional resource demands, it is important to understand where to strike the balance. The ICIN'04 paper Houck D., and H. Uzunalioglu, *An Architecture and Admission Control Algorithm for Multi-Priority Voice over IP (VoIP) Calls*. Proceedings of the 9th International Conference on Intelligence in Service Delivery Networks, October, 2004. Bordeaux, France, on the Call Admission Control/Call Admission Management has addressed this subject in much detail.

Resource Allocation

In the context of describing the present invention, we concentrate on the case—particularly essential to the IMS environment—where it is the application request that triggers resource allocation. The request is delivered via the service control function (such as the IMS P-CSCF); RACF is its recipient.

The types of the resources managed by RACF include public IP addresses and port numbers (assigned to the outbound traffic at the border of a network), and bandwidth. Assignment of the IP addresses and port numbers is relatively straight-forward because it only involves one particular network, which has one pool of these types of resources. The major issues here include transaction control and prevention of deadlocks and authorization.

Bandwidth allocation across multiple domains imposes additional requirements because of the distributed nature of the problem. Some of these additional requirements include: 1) assignment of differentiated services (diffserv) code points, for indicating traffic priority; and 2) selection and assignment of multi-protocol label switching (MPLS) label-switched paths (LSPs). Second, the very decision of whether to admit a particular flow into the network is a matter of bandwidth management, too, because network congestion can negatively affect the performance of all ongoing flows, not just the newly created one. For this reason, we treated admission control separately in the previous section.

Deadlock Prevention

A simple example of a deadlock is when each of the two service processes competing for the same set of two resources (say an IP address and the last available amount of bandwidth). If one process issues the requests in the opposite order than the other one does and each process holds the resource already allocated, neither process will progress (and nor will any other process waiting for any of these processes). In general, deadlocks may occur because processes request resources held by other processes while holding their own resources.

There are three classes of strategies for dealing with the deadlocks:
1. Detection and recovery;
2. Avoidance (in real time); and
3. Prevention; and Of these, in a general case, only prevention is practical, and it is achieved by denying at least one of the four necessary conditions for a deadlock: mutual exclusion, non-preemption, indefinite waiting, and partial allocations (i.e., holding some resources while requesting others). In the case of RACF, mutual exclusion may not be pre-empted—in fact, it must be enforced in all cases. Denying partial allocation would inevitably degrade utilization of the resources. Thus a combination of a collective-requests method (where all the resources are requested in one initial reservation, and no other reservation may be made until these resources are released) with limitation of waiting (which should be achieved by a careful choice of timer values) seems to be the only sensible strategy in most cases.

Bandwidth Allocation

Bandwidth reservations may be explicit or implicit. Explicit reservations typically rely on signaling protocols (such as Resource Reservation Protocol (RFC 2505) or Next Step in Signaling (NSIS) protocols RFC 4080) through which resources are reserved dynamically across network elements. In contrast, implicit resource reservations rely on stored information about available (provisioned or previously reserved) fat pipes. In such cases the bandwidth manager keeps track of the used and available bandwidth through accounting (by keeping the state of the active sessions) or auditing the involved network elements.

We now examine the applicability of two implicit resource reservation approaches and their variants. It is interesting that even though the subject of explicit reservations appears, on the surface, to be much narrower than that of the implicit reservations, the protocol design problems in support of the former across multiple domains are about as complex as those in support of the latter. Consider the situation depicted in FIG. 3. For making a bandwidth reservation in Domain X 310 for a flow in its simplest form, one needs to specify
1. Bandwidth, and
2. Two points (represented by their IP addresses), of which the first point, a, identifies the ingress border gateway of the adjacent Domain Y 320, and the second point, b, identifies the egress border gateway of Domain Z 330.

Domain Y 320, upon receiving such request, has to find its own suitable egress border gateway on the way to domain Z 330, as well as a suitable ingress border gateway in that Domain. The mechanisms for bandwidth-guaranteed ingress/egress router selection have been addressed in [RFC 3272] and Ho, K., N. Wang, P. Trimintzios and G. Pavlou, *Multi-objective Egress Router Selection Policies for Inter-domain Traffic with Bandwidth Guarantees*. Proceedings of the IFIP Networking Conference (Networking'2004), Athens, Greece, May 2004, the contents of each of which are incorporated by reference herein.

We now discuss the mechanism for the implicit reservations employing RACF. We consider two approaches. The first approach is fully distributed, and it requires significant amount of state to be kept in all the domains. The second approach results in a much simpler protocol, but most of the state is kept in one domain. (We propose that it be kept in the terminating domain, and we explain the reason.) In both cases, the implicit reservation and the release of the bandwidth are respectively accomplished with four messages: Reserve, Confirm, Reject, and Release.

Although in both cases that we consider the reservations are initiated only by the terminating RACF (i.e., RACF that belongs to the domain where the terminating party resides), both methods can be used for initiating reservations by the terminating RACF or both the originating and terminating RACFs (a dual RACF approach) at the same time. Overall, the terminating RACF approach is highly desirable because the terminating party often knows the complete address and bandwidth information before the originating party does and therefore can start the reservation process sooner, lowering signaling delay. The dual approach can further lower the call-set-up delay.

Note that for some intelligent-network-supported converged services, the originating party may be a network server that does not interact with RACF.

With regard to a dual approach, the following problems should additionally be considered:
1. Carrying dual reservations in a straight-forward, naïve, way may result in partial allocations; hence, a potential danger of a deadlock: One side might complete a reservation, while the other would fail;
2. It may also double the amount of state to be kept in the network.

One solution to both problems is to progress both reservations toward one another until they reach a common point in the network. We also note that we have intentionally simplified that model by assuming that the domains (of FIG. 3) all trust one another in that they know one another's RACF addresses. In practice, it is highly likely that many domains would not share such addresses with all other domains. In each such case, careful considerations must me made on interworking with other solutions.

Distributed Approach

Figure 4:
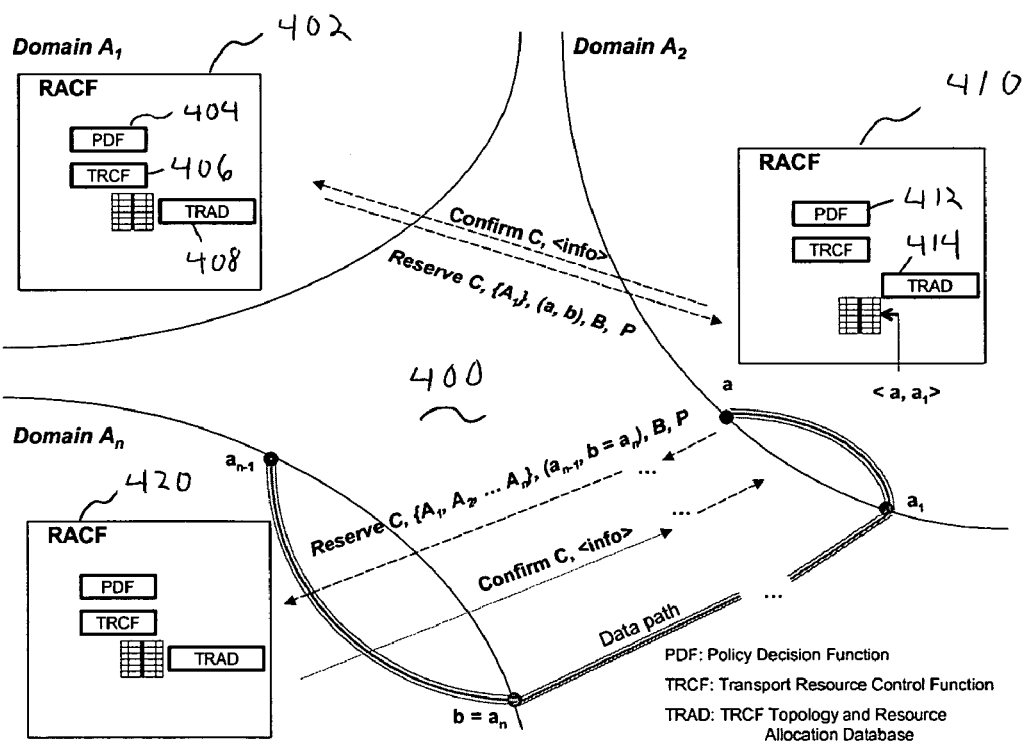
FIG. 4 shows an exemplary network utilizing the present invention to reserve resources for a given reservation.

In the general case, depicted in FIG. 4, we consider reservations that span n domains, $A_1$ to $A_n$, in network 400. The RACF 402 in the first domain, $A_1$, when it receives the request from the terminating State Control Function SCF, first consults its PDF 404 and obtains the authorization. Then it checks its TRCF's 406 Topology and Resource Allocation Database (TRAD) 408 to find a suitable network segment (a, b) to find that a is located in Domain $A_2$. RACF updates the TRAD (by, among other actions, decreasing the available bandwidth and linking it to the reservation) and issues the Reserve request with the following parameters:
1. Request identification, C, which serves as reference to this particular reservation;
2. List of the domains on the way to the sink b (which initially contains only $A_1$);
3. Segment endpoints, a and b;
4. Bandwidth B; and
5. Set of policy requests (which may include traffic priority, set of domains to be avoided, etc.)

On receiving this reservation request, the RACF 410 in Domain $A_2$
1. Examines its database, consults its own PDF 412 and TRAD 414, and ensures that there is a feasible path in which the next domain is not present in the domain list (thus avoiding cycles); and either
2. Rejects the request (by sending back a Reject message which specifies the cause of rejection—such as insufficient bandwidth or impossibility of meeting the policy requirements contained in P); or 3. Determines the appropriate egress and ingress points involved, updates TRAD, and propagates the Reserve request.

If any reservation is rejected, then it is passed back across all the domains involved in the reservation, so that each RACF can destroy the record of the reservation and update its TRAD accordingly.

If all is well, the RACF 420 in Domain $A_n$ completes the reservation. The confirmation (which may also contain certain information specific to the reservation) is sent back along the path.

While the pipe is being used, the RACF can determine that it might want to use another egress router. As long as no change of the ingress router is involved, it only needs to update its TRAD. In a more complex scenario, another set of domains will need to be traversed. Otherwise, it will need to re-send Reserve with the new segment parameter but with the same reservation id. With that, the bandwidth for the unused part of the will be released.

To support this approach, each RACF needs to keep full state information (including the list of all domains traversed by the path). When only a segment of the path is changed, Release needs to be propagated along the old segment after a new one has been established.

This, as well as the general case of releasing the resources make this approach somewhat complex (i.e., about as complex as BGP-TE). For the dual RACF reservations, both the terminating and originating RACFs would keep the state information.

Terminating- and Dual-RACF-Control Approaches

Figure 5:
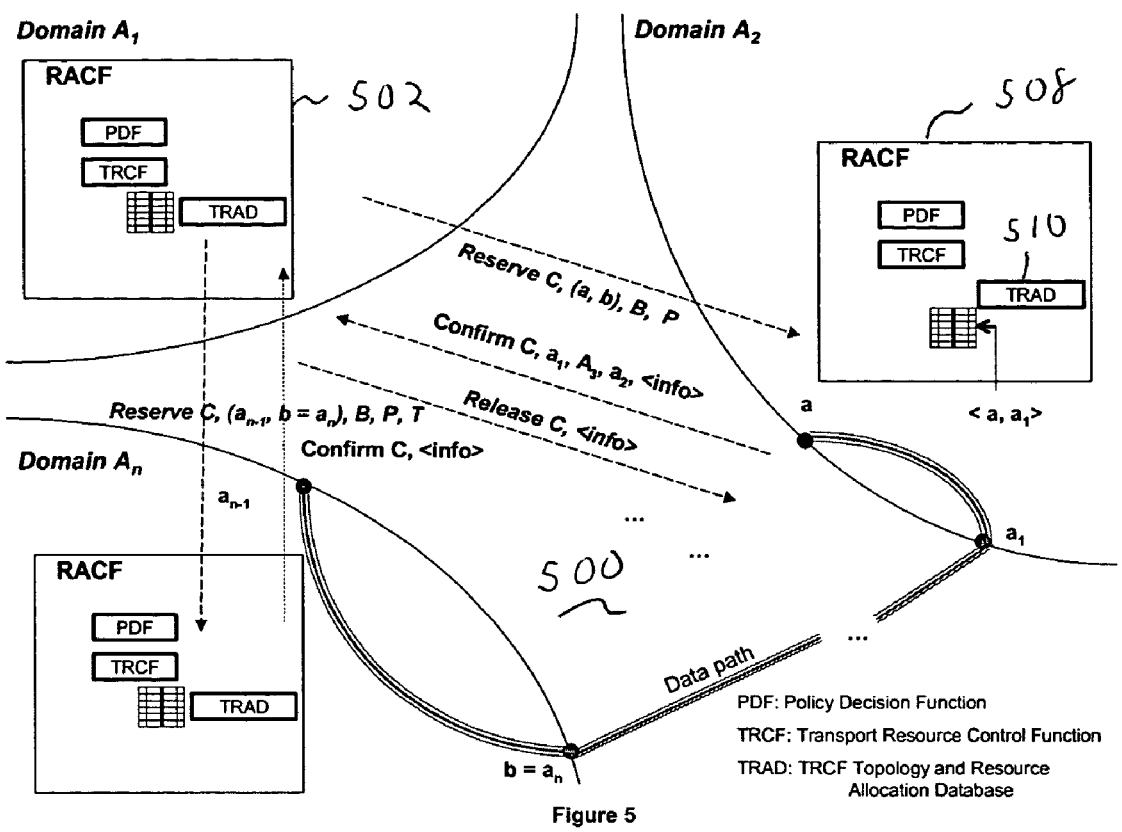
FIG. 5 shows another exemplary embodiment of the present invention for reserving resources for a given reservation.

With the terminating RACF approach, depicted in FIG. 5, the same path, (a, b), as before, which happens to span a set of n domains, $A_1$ to $A_n$, is considered for network 500. As in the former case, the originating RACF 502 is initially unaware of all but the neighboring domain, $A_2$. The originating RACF 502 also follows the same initial steps as before, but the protocol is simpler. The Reserve request still contains the request identification, C; segment endpoints, a and b; bandwidth B; and the set of policy requests (which may include traffic priority, set of domains to be avoided, etc.). One parameter omitted is the domain list, because the request is not going to be propagated.

Instead, on receiving this reservation request and finding that it can satisfy it the RACF 508 in Domain $A_2$, determines the appropriate egress and ingress nodes involved, updates TRAD 510, and responds with the Confirm message, whose parameter list now contains, in addition to the request identification, C, the address of the egress router, $a_1$; the next domain, $A_3$; the address of the next domain's ingress router, $a_2$; and additional information, <info>. (This may contain, for example, RACFs handle to the reservation—to simplify future references.)

The terminating RACF uses these parameters to obtain the reservation for the next segment by sending the Reserve request to $A_3$, and so on. Thus only the terminating RACF keeps the state of the reservation. In the traversed domains, each RACF only needs to store the amount of bandwidth associated with the request C along with the address of the originating RACF. (Although the current embodiment suggests the desirability of keeping state at a terminating RACF, it would be understood that the present invention contemplates that the originating RACF may also be chosen to keep state.)

If the RACF in any domain cannot allocate bandwidth, it sends back Reject; then the originating RACF can retry (by first releasing one or more previous reservations along the path and then attempting an alternative set of reservations) or release all reservations along the path.

The terminating approach requires as many messages as the distributed approach; however, it makes many tasks (including releasing the resources and path restoration) much simpler. Specifically, consider the case when a particular connection is lost (or a router is overloaded). Once TRCF receives this information, RACF can check TRAD and send a Reject message to the RACFs in all the affected domains.

With the dual-RACF approach, the same procedure is started at both the originating and terminating RACFs, which work toward one another until they reach a meet-me point. This can significantly improve the call set-up time. (A distributed approach to keeping state, as has been previously described, may also be utilized in the dual RACF approach.)

We finally note that all the above approaches can interwork with explicit reservations. In other words, they can be used even when one or more of the intermediate domains does not have a provisioned pipe. In this case, a RACF can apply—as the originating host—RSVP or NSIS protocols at the domain's ingress router, and terminate it at an egress router, to establish (and maintain) such a pipe for the duration of the reservation. This hybrid approach may introduce timing problems, which must be carefully considered in the deployment.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A method for resource management in a next generation network (NGN) having multiple different domains comprising the steps of:

receiving, from a terminating domain a request for resources for a given reservation between an originating and a terminating point in said next generation network;

processing said request for a given domain by a central controller for that domain to determine whether routes for said reservation are available and whether necessary bandwidth for said reservation is available wherein an implicit reservation and a release of the bandwidth are respectively accomplished with a specific number of messages; and if said routes and bandwidth are available, confirming said reservation by propagating a reply toward the terminating domain, wherein the central controller of said terminating domain and the central controller of an originating domain keep state for said reservation request, said reservation request converging toward a point between the originating and terminating point of said request.

2. The method of claim 1, further including the steps of: rejecting said reservation request if resources pertaining to said reservation request are unavailable.

3. The method of claim 1, wherein a reservation request includes an identification for the request, originating and terminating endpoint for said reservation, required bandwidth and a set of policy request for said reservation.

4. The method of claim 1, wherein only a central controller of said terminating domain of said reservation keeps state for said reservation request.

5. The method of claim 1, wherein a reservation request further includes a set of domains on a route between said terminating domain and the originating domain.

6. An apparatus for resource management in a multi-protocol next generation network (NGN) having multiple different domains, said resource management being accomplished on a domain wide basis, said apparatus comprising:

a controller operable to start a request for resources for a given reservation from a terminating domain and an originating domain in said next generation network;

said controller being further operable for a given domain to determine whether routes for said reservation are available and whether necessary bandwidth for said reservation is available; and wherein, each controller in a path between the originating point and the terminating point of the reservation processes said request and keeps state for the reservation request, the reservation request converging toward point between an originating and terminating point of said request.

7. The apparatus of claim 6, wherein said controller is operable to process a reservation request that includes an identification for the request, originating and terminating endpoint for said reservation, required bandwidth and a set of policy request for said reservation.

8. The apparatus of claim 6, wherein the controller of said terminating domain keeps state for said reservation request.

9. The apparatus of claim 8, wherein a reservation request further includes a set of domains on a route between said originating domain and said terminating domain.

10. The apparatus of claim 6, wherein only one end central controller in a path between an originating domain and said terminating domain of said reservation keeps state for said reservation request.

11. A method for resource management in a multi-protocol next generation network (NGN) having multiple different domains comprising the steps of:

starting a request for resources for a given reservation at both a terminating and originating Resource and Admission Control Functions (RACF) apparatus in said next generation network;

wherein each end central controller in a path between the originating point and the terminating point of the reservation processes said request and keeps state for the reservation request, wherein processing said request for a given domain by a central controller for that domain comprises determining whether routes for said reservation are available and whether necessary bandwidth for said reservation is available wherein an implicit reservation and a release of the bandwidth are respectively accomplished with a specific number of messages, the reservation request converging toward a point between the originating and terminating point of said request.

12. The method of claim 11, wherein state information of each controller is then shared.

13. The method of claim 11, wherein said converging point is a meet-me point.

14. The method of claim 11, further comprising assigning differentiated services code points for indicating traffic priority.

15. The method of claim 11, further comprising selecting and assigning multi-protocol label switching (MPLS) label-switched paths (LSPs).

16. The method of claim 11, wherein each central controller in a path between said originating RACF and said terminating RACF of said reservation keeps state for said reservation request.

17. The method of claim 11, wherein each end central controller in a path between said originating RACF and said terminating RACF of said reservation keeps state for said reservation request, said reservation request converging toward a point between said originating and terminating RACF of said request, wherein state information of each central controller is then shared.

\* \* \* \* \*